Dec. 5, 1967 A. URANI 3,356,806
PROTECTORS FOR ELECTRIC CIRCUIT
Filed Oct. 11, 1965 2 Sheets-Sheet 1
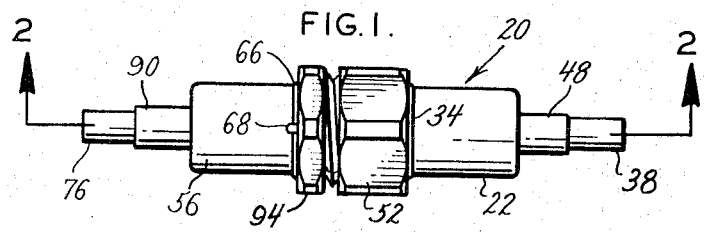
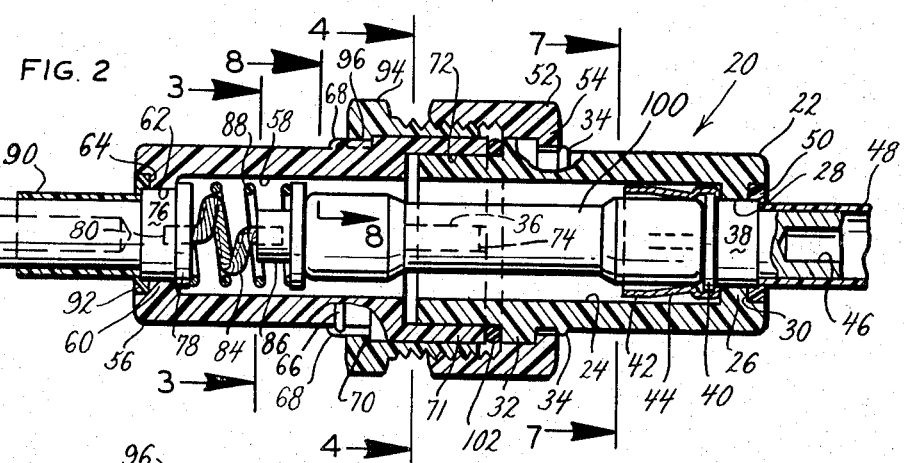
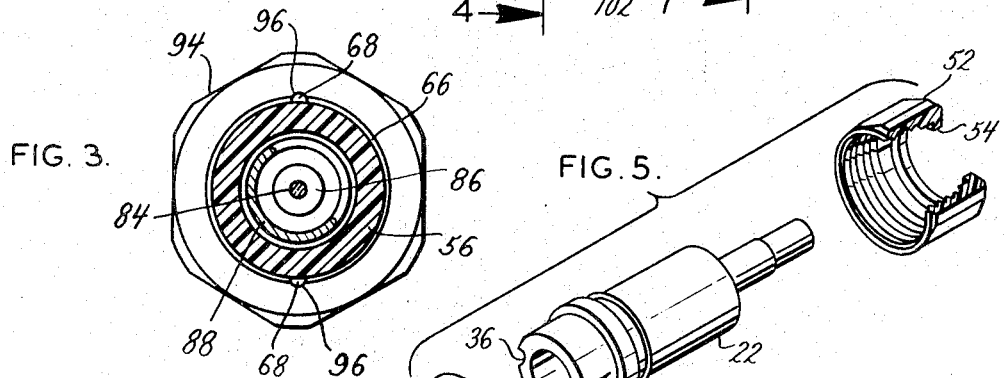
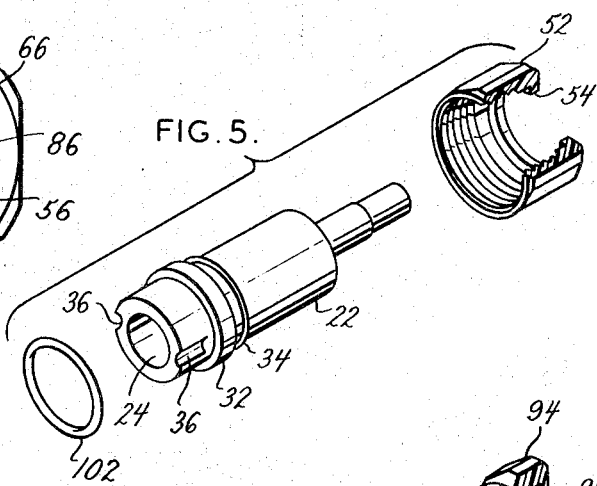
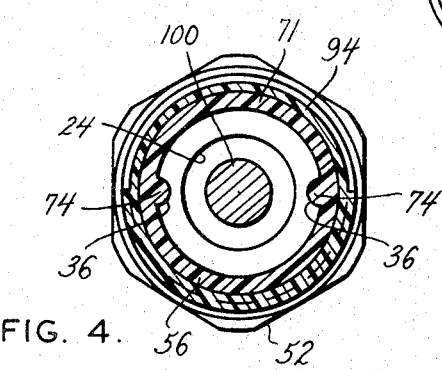
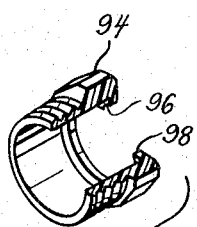

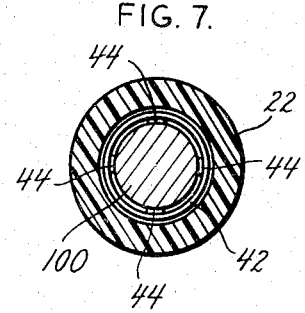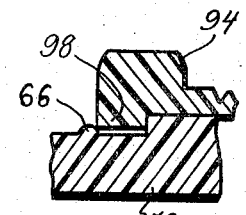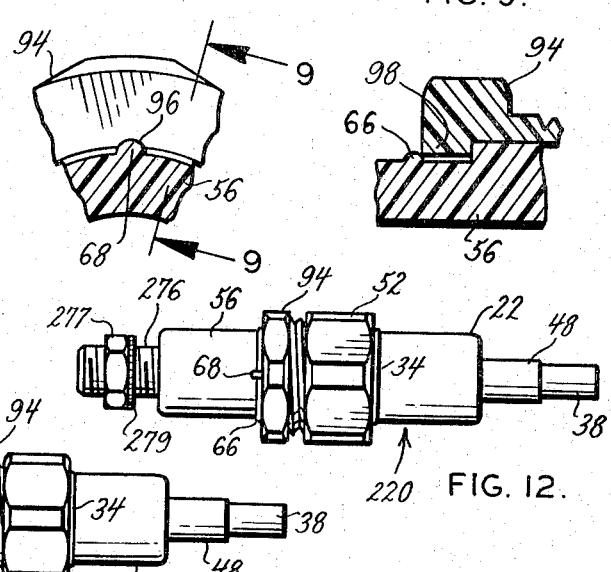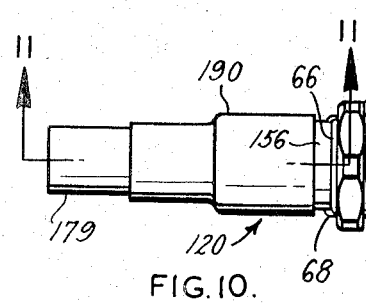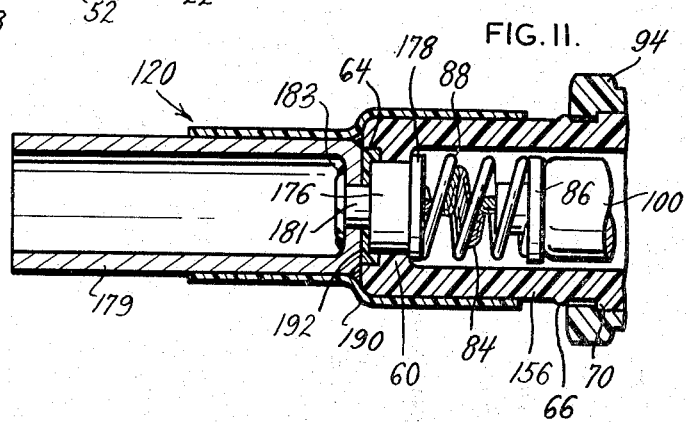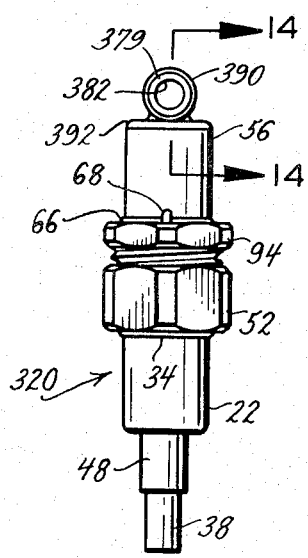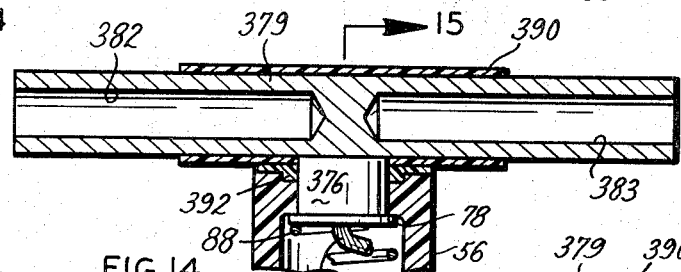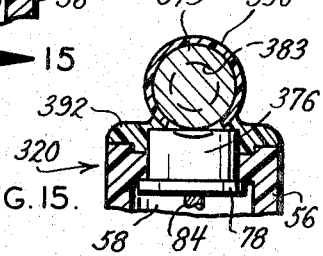

United States Patent Office 3,356,806
Patented Dec. 5, 1967

3,356,806
PROTECTORS FOR ELECTRIC CIRCUIT
Angelo Urani, St. Louis, Mo., assignor to McGraw-Edison Company, Elgin, Ill., a company of Delaware
Filed Oct. 11, 1965, Ser. No. 494,649
9 Claims. (Cl. 200—129)

ABSTRACT OF THE DISCLOSURE

A readily-openable, water-tight holder for electric fuses has two body portions which have shallow recesses therein and which have terminals permanently secured and sealed thereto and in communication with those recesses, has internally-threaded and externally-threaded nuts that are formed independently of those body portions but are pressed over, said thereafter held against accidental separation from those body portions by shallow ribs on those body portions, and is dimensioned so those body portions enclose an electric fuse before that electric fuse is connected into the electric current to be protected thereby.

---

This invention relates to improvements in protectors for electric circuits. More particularly, this invention relates to improvements in holders for electric fuses.

It is, therefore, an object of the present invention to provide an improved holder for electric fuses.

It is frequently necessary to incorporate an electric fuse into a circuit in a location where moisture, corrosive fumes, salt spray, or the like can be expected; and it would be desirable to provide a fuse holder which could connect a fuse into such a circuit and which could protect that fuse from moisture, corrosive fumes, salt spray, or the like. That fuse holder should be sturdy and rugged and yet should permit simple and easy inspection and replacement of the fuse held thereby. The present invention provides such a fuse holder; and it is, therefore, an object of the present invention to provide a fuse holder which can connect a fuse into a circuit, which can protect that fuse from moisture, corrosive gases, salt spray, or the like, which is sturdy and rugged, and which can permit simple and easy inspection and replacement of the fuse.

The fuse holder provided by the present invention has two, readily-separable, body portions; and each of those body portions has a terminal-receiving passage therein and a shallow, annualar recess which communicates with that passage. A terminal is disposed within, and substantially closes, each terminal-receiving passage; and a sealing material fills each shallow, annular recess to provide a water-tight seal between the terminals and the two body portions of the fuse holder. The body portions are provided with surfaces that can confront each other and that can engage and compress an O-ring of resilient material; and those surfaces can coact with that O-ring to form a water-tight seal between the two body portions. The water-tight seals between the two terminals and the two body portions, provided by the sealing material in the shallow, annular recesses, and the water-tight seal between the two body portions provided by the two confronting surfaces and the O-ring, coact to enable the fuse holder of the present invention to provide a completely water-tight enclosure for the fuse. It is, therefore, an object of the present invention to provide a fuse holder which has two, readily-separable body portions, which has a terminal-receiving passage in each body portion, which has shallow, annular recesses communicating with those passages, which has terminals substantially filling those passages, which has sealing material filling those shallow, annular recesses to provide a water-tight seal between those terminals and those body portions, and which has confronting surfaces on those body portions that engage an O-ring to provide a water-tight seal between those body portions.

The terminals of the fuse holder provided by the present invention project outwardly beyond the outer ends of the body portions of that fuse holder; and the outer ends of those terminals can be provided with deep recesses therein to accommodate the insulation-free ends of conductors. The recessed outer ends of the terminals can be crimped onto the insulation-free ends of the conductors to mechanically and electrically inter-connect those terminals and those conductors; and, thereafter, any insulation-free portions of the conductors plus the insulation-free portions of the terminals should be covered with insulation, such as splicing compound, electrical tape, friction tape, or the like. To enable that insulation to adhere tightly to the insulation-free portions of those terminals, heat-shrinkable insulating material is telescoped over a portion of each recessed terminal, and then that heat-shrinkable material is shrunk tightly onto those portions of those terminals. That heat-shrinkable material will provide a surface to which splicing compound, electrical tape, friction tape, or the like can readily adhere. It is, therefore, an object of the present invention to provide a fuse holder with heat-shrinkable material shrunk tightly onto portions of the terminals of that fuse holder.

The readily-separable body portions of the fuse holder provided by the present invention can be made from a tough but inexpensive plastic material such as a phenolic resin. Each of those body portions is provided with an annular shoulder; and the annular shoulder of one of those body portions receives an externally-threaded nut while the annular shoulder on the other of those body portions receives an internally-threaded nut. Those nuts are made independently of the body portions,and hence they can be made from a material, such as nylon, which is better suited to having threads formed thereon than is a phenolic resin. As a result, the fuse holder provided by the present invention can have sturdy, well-formed threads on the nuts thereof, and yet can be made inexpensively. It is, therefore, an object of the present invention to provide a fuse holder with body portions that have annular shoulders thereon and with threaded nuts that are made independently of those body portions.

Each of the body portions of the fuse holder provided by the present invention has a projection which is close to the annular shoulder of that body portion. That projection is small enough to permit the appropriate threaded nut to telescope over it, but is large enough to prevent accidental separation of that nut from that body portion. Those projections make it possible to form the body portions and the threaded nuts independently of each other and to subsequently prevent accidental separation of those nuts from those body portions. It is, therefore, an object of the present invention to provide the body portions of a fuse holder with projections adjacent annular shoulders on those body portions which will permit threaded nuts to telescope over those projections but will thereafter prevent accidental separation of those threaded nuts from those body portions.

One body portion of the fuse holder provided by the present invention will have the terminal thereof connected to the "line" side of a circuit, while the other body portion of that fuse holder will have the terminal thereof connected to the "load" side of that circuit. Each of those body portions has a contact; and those contacts are connected to the terminals of those body portions. The contact within the "load" body portion of the fuse holder is cup-like in configuration and has inwardly-extending portions that will tightly hold any fuse which is pressed into engagement with that contact, whereas the contact within the "line" body portion of that fuse holder is not cup-like in configuration. As a result, a fuse that is assembled with the fuse holder provided by the present invention will be held by the "load" body portion of that holder whenever that fuse holder is opened to permit inspection or replacement of the fuse. The contact within the "line" body portion of the fuse holder and the contact within the "load" body portion of the fuse holder are spaced far enough apart so a fuse which is held by the cup-like contact of the "load" body portion can not engage the contact in the "line" body portion until after the leading ends of the threads on the nuts of the fuse holder have been set in engagement with each other. This is important, because any arc which might form as a fuse was moved into engagement with the contact in the "line" body portion of the fuse holder would be wholly and completely confined by the fuse holder. It is, therefore, an object of the present invention to provide a fuse holder with a contact in the "load" body portion thereof which will tightly hold a fuse, to provide a contact in the "line" body portion thereof, to provide threaded nuts to hold those body portions in assembled relation, and to space those contacts far enough apart so a fuse held by the contact in the "load" body portion can not engage the contact in the "line" body portion until after the threads on those nuts have engaged each other.

The contact in the "line" body portion of the fuse holder provided by the present invention is movable within that body portion; and a helical compression spring urges that contact toward the open end of that body portion. That helical compression spring can, however, yield when a fuse carried by the cup-like contact within the "load" body portion of the fuse holder is telescoped into the "line" body portion of that fuse holder and the threads on the threaded nuts of that fuse holder force the confronting surfaces on those body portions into sealing engagement with the O-ring. A flexible conductor extends between and electrically interconnects the terminal and the contact in the "line" body portion of the fuse holder; and that flexible conductor permits that contact to move while permitting that terminal to remain in water-tight engagement with the "line" body portion of the fuse holder. It is, therefore, an object of the present invention to provide a fuse holder with a "line" body portion which has a terminal fixedly secured thereto in water-tight engagement, which has a movable contact that is urged away from that terminal by a helical compression spring, and which has a flexible conductor extending between and electrically interconnecting that contact and that terminal.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing,

FIG. 1 is a side elevational view of one preferred embodiment of fuse holder that is made in accordance with the principles and teachings of the present invention, FIG. 2 is a sectional view, on a larger scale, through the fuse holder of FIG. 1, and it is taken along the plane indicated by the line 2—2 in FIG. 1, FIG. 3 is a sectional view, on the scale of FIG. 2, through the fuse holder of FIG. 1, and it is taken along the plane indicated by the line 3—3 in FIG. 2, FIG. 4 is another sectional view, on the scale of FIG. 2, through the fuse holder of FIG. 1, and it is taken along the plane indicated by the line 4—4 in FIG. 2, FIG. 5 is an exploded view of some of the component parts of the fuse holder of FIG. 1, FIG. 6 is an exploded view of further of the components of the fuse holder of FIG. 1, after those components have been rotated approximately one hundred and eighty degrees from the position shown in FIG. 1, FIG. 7 is a still further sectional view, on the scale of FIG. 2, through the fuse holder of FIG. 1, and it is taken along the plane indicated by the line 7—7 in FIG. 2, FIG. 8 is a sectional view, on a greatly enlarged scale, through a portion of the fuse holder of FIG. 1, and it is taken along the plane indicated by the line 8—8 in FIG. 2, FIG. 9 is a sectional view through the portion of the fuse holder shown in FIG. 8, and it is taken along the plane indicated by the line 9—9 in FIG. 8.

FIG. 10 is a side elevational view of another preferred embodiment of fuse holder that is made in accordance with the principles and teachings of the present invention, FIG. 11 is a sectional view, on a larger scale, through the fuse holder of FIG. 10, and it is taken along the plane indicated by the line 11—11 in FIG. 10, FIG. 12 is a side elevational view of a further preferred embodiment of fuse holder that is made in accordance with the principles and teachings of the present invention, FIG. 13 is a side elevational view of a still further preferred embodiment of fuse holder that is made in accordance with the principles and teachings of the present invention, FIG. 14 is a sectional view, on a larger scale, through part of the fuse holder of FIG. 13, and it is taken along the plane indicated by the line 14—14 in FIG. 13, and FIG. 15 is a sectional view, on the scale of FIG. 14, through the fuse holder of FIG. 13, and it is taken along the plane indicated by the line 15—15 in FIG. 14.

Referring to FIGS. 1–9 in detail, the numeral 20 generally denotes a preferred embodiment of fuse holder that is made in accordance with the principles and teachings of the present invention. That fuse holder has a body portion 22 of cylindrical form which has a cylindrical recess 24 therein. A wall 26 is provided at one end of the cylindrical recess 24, and the other end of that recess is open. A passage 28 is provided in the wall 26, and an annular recess 30 is provided in the outer face of that wall; and that recess communicates with that passage. An annular shoulder 32 of rectangular cross section is formed on the exterior of the body portion 22, and that annular shoulder is closer to the left-hand end of that body portion than it is to the right-hand end of that body portion, as shown particularly by FIG. 5. A shallow, annular rib 34 is formed on the exterior of the body portion 22 a short distance to the right of the annular shoulder 32. Two axially-extending, arcuate grooves 36 are formed in the exterior of the body portion 22; and those grooves extend from the left-hand end of that body portion to points immediately adjacent the left-hand face of the annular shoulder 32. Those arcuate grooves are located at the opposite ends of a diameter of the body portion 22. The body portion 22 is preferably formed from an inexpensive but tough plastic material; and phenolic resins constitute plastic materials which are very useful in forming that body portion.

The numeral 38 denotes a terminal which has a flanged inner face 40; and a short portion of that terminal is dimensioned to fit snugly within the passage 28 in the wall 26 of the body portion 22, while the flanged inner face 40 is dimensioned so it can not pass through that passage. The terminal 38 also has an elongated shank with an elongated recess 46 therein; and the diameter of that shank is smaller than the diameter of the short portion which is disposed within the passage 28. A cup-like contact 42 has an opening in the closed end thereof through which the shank and the short portion of the terminal 38 extend; but the flanged inner face 40 of that terminal is too large to pass through that opening. Axially-extending projections 44 are provided at the inner face of the cup-like contact 42, and those projections incline rearwardly and inwardly of that contact, as shown particularly by FIG. 2. The flanged inner face 40 of the terminal 38 will be used to press the cup-like contact 42 against the wall 26 of the body portion 22, and then the periphery of the outer face of the short portion of that terminal will be staked or riveted into the annular recess 30 in that body portion to fixedly secure that terminal and that contact to each other and to that body portion.

A sleeve 48 of heat-shrinkable insulation is telescoped over the shank of the terminal 38; and that sleeve extends into the annular recess 30 in the body portion 22 to abut the short portion of that terminal. That sleeve is shrunk into intimate engagement with the terminal 38 by suitable application of heat.

A sealing material 50, such as an epoxy resin, is used to fill the annular recess 30 in the right-hand end of the body member 22. That sealing material provides a water-tight seal between that body member and the terminal 38.

The numeral 52 denotes an internally-threaded nut; and that nut has an end wall 54 with a large opening therein. The smallest diameter of the thread of the internally-threaded nut 52 is large enough to enable that nut to freely telescope over the annular shoulder 32 on the body portion 22; but the diameter of the opening in the end wall 54 of that internally-threaded nut is smaller than the diameter of that annular shoulder. As a result, that end wall can abut and bear against the right-hand face of the annular shoulder 32 on the body member 22, as shown by FIG. 2; and, in abutting and bearing against that annular shoulder, that wall can prevent further movement of the internally-threaded nut to the left in FIG. 2. The diameter of the opening in the end wall 54 of the internally-threaded nut 52 is very close to the diameter of the shallow, annular rib 34 at the exterior of the body member 22; and, as a result, an appreciable force must be applied to the internally-threaded nut 52 to cause the opening in the end wall 54 thereof to slip over that annular rib. Thereafter, that shallow, annular rib will prevent accidental separation of the internally-threaded nut 52 from the body portion 22.

The numeral 56 denotes a body portion of cylindrical form which has a cylindrical recess 58 therein. A wall 60 is provided at one end of the recess 58, and the other end of that recess communicates with a larger-diameter cylindrical recess 72 in the body portion 56. The recess 72 is in a larger-diameter section 71 of that body portion; and it opens to the right-hand end of that body portion. The recess 72 is dimensioned to telescope over the left-hand end of the body portion 22, as shown by FIG. 2. An abrupt annular shoulder 70 is provided intermediate the larger diameter section 71 of the body portion 56 and the rest of that body portion. A passage 62 is provided in the wall 60 of the body portion 56; and an annular recess 64 is provided in the outer face of that wall, and that recess communicates with that passage. A shallow, annular rib 66 is formed on the exterior of the body portion 56 a short distance to the left of the annular shoulder 70. Axially-extending, shallow ribs 68 are provided at the exterior of the body portion 56, and those ribs extend from points immediately to the left of the shallow, annular rib 66 in FIG. 2 to the annular shoulder 70 on that body portion. Two axially-extending ribs 74 are formed at the interior of the larger-diameter section 71, as shown particularly by FIG. 6; and those axially-extending ribs are dimensioned to fit snugly within the axially-extending arcuate grooves 36 in the exterior of the body portion 22. The body portion 56 is preferably formed from an inexpensive but tough plastic material, and phenolic resins constitute plastic materials which are very useful in forming that body portion.

The numeral 76 denotes a terminal which has a flanged inner face 78; and a short portion of that terminal is dimensioned to fit snugly within the passage 62 in the wall 60 of the body portion 56, while the flanged inner face 78 is dimensioned so it can not pass through that passage. The terminal 76 has an elongated shank with an elongated recess 82 therein; and the flanged outer face 78 of that terminal has a shallow socket 80 therein. The flanged inner face 78 will be pressed into engagement with the wall 60, and then the periphery of the outer face of the short portion of that terminal will be staked or riveted into the annular recess 64 in the body portion 56 to fixedly secure that terminal to that body portion. The numeral 86 denotes a movable contact which has the form of a shallow cylinder with a radially-extending flange at the right-hand face thereof. A shallow socket is formed in the left-hand face of that contact; and the right-hand end of a flexible conductor 84 extends into that socket. The left-hand end of that flexible conductor extends into the socket 80 in the terminal 76; and solder will be used to bond that left-hand end within the socket 80 and will be used to bond the right-hand end of that flexible conductor within the socket in the left-hand face of the contact 86. A helical compression spring 88 surrounds the flexible conductor 84; and the left-hand end of that spring bears against the flanged inner face 78 of the terminal 76 while the right-hand end of that spring bears against the radially-extending flange on the contact 86. That helical compression spring biases the contact 86 to the right in FIG. 2, but it can yield to permit that contact to be moved to, and held in, the position shown by FIG. 2. The flexible conductor 84 shunts the spring 88 and keeps sudden current surges from heating that spring to temperatures at which that spring will lose some of its restorative force.

A sleeve 90 of heat-shrinkable insulation is shrunk into intimate engagement with the shank of the terminal 76; and that sleeve extends into the recess 64 to abut the short portion of the terminal 76. A sealing material 92, such as an epoxy resin, is disposed within the recess 64 in the left-hand end of the body portion 56; and that sealing material will fill that recess and will provide a water-tight seal between the terminal 76 and the body portion 56.

The numeral 94 denotes an externally threaded nut, and the thread on that nut is formed and dimensioned to mate with the thread on the internally-threaded nut 52. The nut 94 has an end wall 98 with a large opening therein; and the inner diameter of that nut is large enough to enable that nut to telescope freely over the larger-diameter section 71 of the body portion 56, but the diameter of the opening in the end wall 98 is smaller than the diameter of that larger-diameter section. As a result, the end wall 98 can abut and bear against the shoulder 70 on the body portion 56, and thereby prevent further movement of the nut 94 to the right in FIG. 2. Two shallow notches 96 are formed in the end wall 98, and those shallow notches are dimensioned to telescope over the axially-extending ribs 68 at the exterior of the body portion 56. The engagement between the notches 96 in the end wall 98 of the nut 94 and the ribs 68 at the exterior of the body portion 56 will prevent rotation of that nut relative to that body portion. The diameter of the opening in the end wall 98 of the nut 94 is very close to the diameter of the shallow, annular rib 66 at the exterior of the body member 56; and, as a result, an appreciable force must be applied to the nut 94 to cause the opening in the end wall 98 to slip over that annular rib. Thereafter, that shallow, annular rib will prevent accidental separation of the nut 94 from the body portion 56.

The internally-threaded nut 52 and the externally-threaded nut 94 are preferably made from a tough material which is capable of having strong threads formed thereon. One such material is nylon. Both of the nuts 52 and 94 have polygonal wrench-receiving surfaces at the exterior thereof; and those surfaces enable wrenches to grip and tighten those nuts.

The numeral 100 denotes an electrical fuse which is dimensioned to telescope within the cylindrical recesses 24 and 58, respectively, in the body portions 22 and 56. That fuse has ferrule-like terminals at the opposite ends thereof; and one of those terminals will extend into, and be held by, the cup-like contact 42, while the other of those terminals will abut the radially-extending flange on the contact 86. The projections 44 at the interior of the cup-like contact 42 will yield to permit the said one terminal of the fuse 100 to be forced into engagement with the flanged inner face 40 of the terminal 38, but they will apply such strong holding forces to that terminal that an appreciable force will have to be applied to that fuse to free it from that cup-like contact. Those holding forces are desirable because they prevent accidental separation of the fuse 100 from the cup-like contact 42.

The numeral 102 denotes an O-ring which is made from a resilient material. That O-ring is dimensioned to telescope over the left-hand end of the body member 22 and to abut the left-hand face of the annular shoulder 32 on that member. The O-ring 102 will be engaged by the right-hand end face of the larger-diameter section 71 of the body portion 56.

In using the fuse holder of FIGS. 1–9, the insulation-free end of a conductor, not shown, which is connected to the "line" side of an electrical circuit is telescoped within the recess 82 in the terminal 76, and then a crimping tool will be used to crimp the shank of that terminal tightly onto that end of that conductor. Thereafter, field-installed insulation, such as splicing compound, electrical tape, friction tape or the like, will be used to cover the insulation-free portion of the shank of terminal 76 and the insulation-free portions of that conductor. The sleeve 90 of insulation will not only perform an insulating function but will also serve as a surface to which the field-installed insulation will readily adhere. Absent the sleeve 90, that insulation might not provide a tight and intimate engagement with the terminal 76.

The insulation-free end of a conductor, not shown, which is connected to the "load" side of the electrical circuit will be telescoped within the recess 46 in the terminal 38; and a suitable crimping tool will be used to crimp the shank of that terminal onto that end of that conductor. Thereafter, field-installed insulation, such as splicing compound, electrical tape, friction tape or the like, will be used to cover the insulation-free portion of the shank of terminal 38 and the insulation-free portion of the end of that conductor. The sleeve 48 of insulation will not only perform an insulating function but will also serve as a surface to which the field-installed insulation will readily adhere.

A fuse 100 will then be telescoped into the cylindrical recess 24 in the body portion 22, and will have the inner terminal thereof presed into the cup-like contact 42 until that inner terminal abuts the flanged inner face 40 of the terminal 38. The projections 44 will yield to permit that fuse terminal to be moved into engagement with that flanged inner face; but those projections will thereafter apply very strong holding forces to that fuse terminal. The outer terminal of the fuse 100 will project outwardly beyond the end of the body portion 22; but the electrician or maintenance man can not receive a shock if he touches that fuse terminal, because the cup-like contact 42 and the terminal 38 connect that fuse to the "load" side rather than to the "line" side of the electrical circuit.

The electrician or maintenance man will align the axially-extending arcuate grooves 36 in the left-hand end of the body portion 22 with the axially-extending ribs 74 at the interior of the larger-diameter section 71 of the body portion 56; and then he will move those body portions toward each other. The outer terminal of the fuse 100 will be moved into and through the cylindrical recess 72 in the body portion 56 and will then be moved into the cylindrical recess 58 in that body portion. Prior to the time the outer terminal of the fuse 100 can engage the radially-extending flange of the movable contact 86, the left-hand end of the body portion 22 will have telescoped within the outer end of the cylindrical recess 72 in the larger-diameter section 71 of the body portion 56. This is important, because it makes absolutely certain that any arc which could form as the fuse 100 engaged the radially-extending flange of the contact 86 would be wholly enclosed and could not injure the electrician or maintenance man.

As the left-hand end of the body portion 22 is telescoped within the cylindrical recess 72 in the larger-diameter section 71 of the body portion 56, the axially-extending arcuate grooves 36 will accommodate the axially-extending ribs 74; and thereafter those grooves and those ribs will prevent relative rotation of the body portions 22 and 56. After the first turn of the internal thread of the nut 52 has engaged the first turn of the external thread of the nut 94, the nut 52 will be rotated in the counterclockwise direction in FIG. 5. While that rotation will tend to cause the nut 94 to rotate in that same direction, such rotation is prevented by the interaction of the axially-extending arcuate grooves 36 and the axially-extending ribs 74 and by the interaction between the notches 96 in the end wall 98 of that nut and the axially-extending ribs 68 on the exterior of the body portion 56. As a result, counterclockwise rotation of the nut 52 will cause that nut to thread onto the nut 94. The end walls 54 and 98, respectively, of the nuts 52 and 94 will be forced toward each other; and those end walls will act through the shoulders 32 and 70 to force the left-hand face of the shoulder 32 toward the right-hand end of the larger-diameter section 71 of the body portion 56. That left-hand face of that shoulder and that right-hand face of that larger-diameter section will abut and compress the O-ring 102, thereby forming a water-tight seal between themselves and that O-ring.

As the end walls 54 and 98, respectively, of the nuts 52 and 94 are forced to move toward each other, the left-hand terminal of the fuse 100 will engage the radially-extending flange on the contact 86 and force that contact to move toward the position shown by FIG. 2. The flexible conductor 84 and the helical compression spring 88 will both yield to permit that contact to move toward that position. However, the helical compression spring 88 will develop restorative forces therein which will hold the outer face oft he radially-extending flange on the terminal 86 in intimate engagement with the left-hand terminal of the fuse 100.

Whenever the fuse 100 is to be inspected or replaced, it is only necessary to rotate the nut 52 in the clockwise direction in FIG. 5 until that nut is freed from the nut 94, to move the body portion 22 away from the body portion 56, and to withdraw the fuse 100 from its position within the recess 24 in the body portion 22. If an arc tends to form as the left-hand terminal of the fuse 100 is moved away from the radially extending flange on the terminal 86—and such an arc could form if the fuse 100 was intact and the fuse holder 20 was opened while that fuse was carrying current—that arc would be initiated while the left-hand end of the body portion 22 was disposed within the cylindrical recess 72 in the larger-diameter section 71 of the body portion 56. As a result, that arc would be confined and could not injure the electrician or maintenance man.

Referring particularly to FIG. 10, the numeral 120 generally denotes another preferred embodiment of fuse holder that is made in accordance with the principles and teachings of the present invention. That fuse holder has a body portion 22, a terminal 38, a sleeve 48 of insulation, and an internally-threaded nut 52 which are identical to the similarly-numbered body portion, terminal, sleeve of insulation, and internally threaded nut of FIGS. 1–9. The fuse holder 120 has a body portion 156 which is very similar to the body portion 56 in FIGS. 1–9. Thus, the body portion 156 has a cylindrical recess 58, a wall 60, a passage 62 in that wall, an annular recess 64 in the outer face of that wall, a shallow, annular rib 66 at the exterior thereof, shallow, axially-extending ribs 68 at the exterior thereof, and an abrupt annular shoulder 70 at the exterior thereof. That cylindrical recess, that wall, that passage, that annular recess, that shallow, annular rib, those axially-extending ribs, and that abrupt annular shoulder are identical to the similarly-numbered items in FIGS. 1–9.

The body portion 156 differs from the body portion 56 in having a terminal 176 with a rivet-like shank 181 extending through a passage in the end wall of an elongated cup-like terminal extension 179. That terminal also has a flanged inner face 178 which is similar to the flanged inner face 78 of the terminal 76 of FIGS. 1–9. A sealing material 192, such as an epoxy resin, is disposed within the annular recess 64 in the left-hand face of the wall 60 of the body portion 156; and that sealing material provides a water-tight seal between the terminal 176 and the body portion 156. After the sealing material 192 has hardened, the passage in the end wall of the terminal extension 179 is telescoped over the shank 181 of the terminal 176; and then the outer end of that shank is riveted over to permanently secure that terminal extension to the terminal 176. Solder 183 is then applied to the riveted-over inner end of the shank 181 and the interior of the terminal extension 179 to electrically bond them together. Thereafter, a sleeve 190 of heat-shrinkable material is telescoped over the exterior of the terminal extension 179 and a considerable portion of the exterior of the body portion 156, and is then shrunk into intimate engagement with that terminal extension and that body portion. That sleeve keeps moisture, corrosive fumes, salt spray, or the like from reaching the junction between the terminal 176 and the terminal extension 179.

An externally-threaded nut 94, which is identical to the similarly-numbered nut in FIGS. 1–9, is held adjacent the annular shoulder 70 by the shallow annular rib 66. That externally-threaded nut will coact with the internally-threaded nut 52 to releasably hold the body members 22 and 156 in assembled relation.

The fuse holder 120 of FIGS. 10 and 11 differs principally from the fuse holder 20 of FIGS. 1–9 in the large diameter of the recess within the terminal extension 179. That recess is large enough to accommodate the insulation-free ends of a plurality of conductors in side-by-side relation. Once those ends of those conductors have been telescoped within that recess, that terminal extension can be crimped onto those conductors to mechanically and electrically secure those conductors to that terminal extension. As a result, the fuse holder 120 makes it very easy to connect a plurality of "line" conductors to a single "load" conductor.

If desired, the fuse holder 120 could be made so the body portion 22 was equipped with an elongated terminal extension comparable to the terminal extension 179. Where that was done, the resulting fuse holder could easily connect a plurality of "line" conductors to a plurality of "load" conductors. If a body portion 22, equipped with a terminal extension like the terminal extension 179, were to be used with the body portion 56 of FIGS. 1–9, the resulting fuse holder could easily connect a single "line" conductor to a plurality of "load" conductors.

Referring particularly to FIG. 12, the numeral 220 denotes a further preferred embodiment of fuse holder that is made in accordance with the principles and teachings of the present invention. That fuse holder has a body portion 22, a terminal 38, a sleeve 48 of insulation, and an internally-threaded nut 52 which can be identical to the similarly-numbered components of the fuse holder of FIGS. 1–9. The fuse holder 220 has a body portion 56 and an externally-threaded nut 94 which can be identical to the similarly-numbered components of FIGS. 1–9. The fuse holder 220 of FIG. 12 principally differs from the fuse holder 20 of FIGS. 1–9 in that the terminal carried by the body portion 56 has a threaded shank 276 which accommodates a lock washer 279 and a nut 277. The fuse holder 220 can be used wherever it is desirable to connect the "line" conductor to the fuse holder by bending that conductor around the threaded shank 276 and then tightening the nut 277.

Referring particularly to FIGS. 13–15, the numeral 320 generally denotes a still further preferred embodiment of fuse holder that is made in accordance with the principles and teachings of the present invention. That fuse holder has a body portion 22, a terminal 38, a sleeve 48 of insulation, and an internally-threaded nut 52 which can be identical to the similarly-numbered components of FIGS. 1–9. That fuse holder has a body portion 56 and an externally-threaded nut 94 which can be identical to the similarly-numbered components of FIGS. 1–9. The fuse holder 320 of FIGS. 13–15 principally differs from the fuse holder 20 of FIGS. 1–9 in having a terminal 376 provided with a transversely-extending terminal extension 379. An elongated recess 382 is provided in the left-hand end of that terminal extension and an elongated recess 383 is provided in the right-hand end of that terminal extension. A sealing material 392, such as an epoxy resin, is used to provide a water-tight seal between the body portion 56 and the terminal extension 379. After the sealing material 392 has hardened, the terminal extension 379 with its heat-shrunk sleeve 390 of insulation thereon will be soldered to the terminal 376. A portion of the sleeve 390 will be cut-away to facilitate the soldering of that terminal extension to that terminal.

The insulation-free end of a conductor can be telescoped into the recess 382, and then the walls of that recess can be crimped onto that end of that conductor. The insulation-free end of another conductor can be telescoped into the recess 383, and then the walls of that deep recess can be crimped onto that end of that conductor. A further conductor can be telescoped into the recess in the terminal 38, and then the walls of that recess can be crimped onto that conductor. The fuse holder 320 is particularly desirable where two "line" conductors are to be connected to a "load" conductor and the lengths of those "line" conductors are not long enough to permit the insulation-free ends thereof to be set in side-by-side relation and telescoped into the terminal extension 179 of the fuse holder 120 of FIGS. 10 and 11.

If desired, any of the body portions 22 of the fuse holders 20, 120, 220 and 320 could be provided with a terminal which had a transversely-extending terminal extension similar to the transversely-extending terminal extension 379. Such a body portion would facilitate the securement of two "load" conductors to the cup-like contact 42 within that body portion. Such a body portion would be very useful where the lengths of the "load" conductors were too short to enable the insulation-free ends thereof to be set in side-by-side relation and telescoped into a terminal extension like the terminal extension 179 in FIGS. 10 and 11.

The body portions of the various embodiments of fuse holder provided by the present invention are rigid and sturdy; and the terminals carried by those body portions are rigidly and sturdily secured to those body portions. Further, the internally-threaded and externally-threaded nuts for those embodiments of fuse holder provide a rigid and sturdy connection between those body portions. As a result, any electric fuses held within the various embodiments of fuse holder provided by the present invention will be encased within a sturdy and rugged enclosure and will be protected against mechanical stresses and strains.

The internally-threaded and externally-threaded nuts for the various embodiments of fuse holder provided by the present invention overlie and protect the O-rings which serve as yieldable gaskets. Not only do those internally-threaded and externally-threaded nuts keep those O-rings from being cut or torn, but they also keep sand or gravel from contacting those O-rings and preventing proper sealing action by those O-rings as those O-rings are compressed between the confronting faces of the body portions of those embodiments of fuse holder. In this way, those internally-threaded and externally-threaded nuts enable those embodiments of fuse holder to function properly in poor as well as in good environments.

The internally-threaded and externally-threaded nuts and the body portions of the embodiments of fuse holder provided by the present invention are made from non-metallic materials. As a result, those internally-threaded and externally-threaded nuts and those body portions will not corrode even though they are used in areas where corrosion is normally a serious problem. Because those internally-threaded and externally-threaded nuts and those body portions will not corrode, they can easily be disassembled to permit a blown fuse to be replaced, and they can be used indefinitely.

The O-rings used in the various embodiments of fuse holder provided by the present invention are carried by the male body portions rather than by the female body portions of those embodiments of fuse holder. This is desirable because it keeps the manufacturing tolerances of those O-rings from causing those O-rings to bend and distort—as could happen if those O-rings were to be carried by those female body portions and were oversize.

The flexible conductors used in the various embodiments of fuse holder provided by the present invention are given a generally helical configuration. That configuration enables those flexible conductors to extend and retract with ease, as fuses are removed from and introduced into those embodiments of fuse holder, even though those flexible conductors are given cross sections that are large enough to enable them to carry as much as thirty amperes.

Whereas the drawing and accompanying description have shown and described several preferred embodiments of the present invention it should be apparent to those skilled in the art that various changes may be made in the form of the invention without affecting the scope thereof.

What I claim is:
1. A holder for an electric fuse which comprises:
(a) a body portion,
(b) said body portion having an abrupt annular shoulder at the exterior thereof intermediate the ends thereof,
(c) said body portion having a shallow, annular rib at the exterior thereof spaced a short distance from said abrupt annular shoulder,
(d) said body portion having axially-extending, arcuate grooves in the exterior thereof adjacent one of the ends thereof,
(e) an internally-threaded nut with an end wall,
(f) said end wall of said nut having an opening therein,
(g) the smallest diameter of the thread of said internally-threaded nut being large enough to enable said nut to telescope over said abrupt annular shoulder on said body portion,
(h) said opening in said end wall of said nut having a diameter close to the diameter of said shallow, annular rib so said nut must be forced over said shallow, annular rib and so said shallow, annular rib will thereafter prevent accidental separation of said nut from said body portion,
(i) the diameter of said opening in said end wall of said nut being smaller than the diameter of said abrupt, annular shoulder so said end wall of said nut can abut and bear against said abrupt, annular shoulder,
(j) a second body portion,
(k) said second body portion having an abrupt annular shoulder at the exterior thereof,
(l) a shallow, annular rib on the exterior of said second body portion spaced a short distance from said abrupt annular shoulder on said second body portion,
(m) shallow, axially-extending ribs on the exterior of said second body portion extending from points adjacent said shallow, annular rib on the exterior of said second body portion to said abrupt annular shoulder on said second body portion,
(n) axially-extending ribs on said second body portion that are dimensioned to extend into said axially-extending, acruate grooves in the exterior of the first said body portion to prevent relative rotation between said body portions whenever said body portions are assembled together,
(o) an externally-threaded nut with a thread that is adapted to engage and mate with the thread on said internally-threaded nut, and
(p) said externally-threaded nut having an end wall with an opening therein,
(q) said opening in said end wall of said externally-threaded nut being dimensioned to telescope over one of the ends of said second body portion but being too small to telescope over said abrupt annular shoulder on said second body portion,
(r) said end wall of said externally-threaded nut having notches therein dimensioned to telescope over said axially-extending ribs at the exterior of said second body portion,
(s) said opening in said end wall of said externally-threaded nut having a diameter close to the diameter of said shallow, annular rib on the exterior of said second body portion so said externally-threaded nut must be forced over said shallow, annular rib and so said shallow, annular rib will thereafter prevent accidental separation of said externally-threaded nut from said second body portion.

2. A readily-openable holder for an electric fuse which comprises:
(a) a body portion that has a recess in one end thereof to releasably accommodate one end of an electric fuse, said recess having a length shorter than the overall length of said electric fuse,
(b) said body portion having a shoulder at the exterior thereof which projects outwardly beyond adjacent portions of said exterior of said body portion to serve as an abutment,
(c) said body portion having a rib at the exterior thereof spaced from said shoulder which acts as a stop,
(d) an internally-threaded nut with an end wall,
(e) said end wall of said nut having an opening therein to enable said end wall to telescope over one of the ends of said body portion,
(f) the smallest diameter of the thread of said nut being large enough to enable said thread to telescope over said shoulder,
(g) said opening in said end wall of said nut being dimensioned so said nut must be forced over said rib and so said rib will thereafter serve as a stop and thereby prevent accidental separation of said nut from said body portion,
(h) said opening in said end wall of said nut being dimensioned so said end wall of said nut can abut and bear against said shoulder but can permit rotation of said nut relative to said body portion,
(i) a second body portion that has a recess in one end thereof to releasably accommodate the opposite end of said electric fuse, said recess having a length shorter than the overall length of said electric fuse,
(j) said second body portion having a shoulder at the exterior thereof which projects outwardly beyond adjacent portions of said exterior of said second body portion to serve as an abutment,
(k) said second body portion having a rib at the exterior thereof spaced from said shoulder which acts as a stop,
(l) rotation-resisting surfaces on the said first and said second body portions that interact to prevent relative rotation between said body portions whenever said one end of said electric fuse is disposed within said recess in the first said body portion and said opposite end of said electric fuse is disposed within said recess in said second body portion,
(m) an externally-threaded nut with a thread that is adapted to engage and mate with the thread on said internally-threaded nut, (n) said externally-threaded nut having an end wall with an opening therein,
(o) said opening in said end wall of said externally-threaded nut being dimensioned to telescope over one of the ends of said second body portion but being too small to telescope over said shoulder on said second body portion,
(p) said externally-threaded nut and said second body portion having rotation-resisting surfaces thereon that coact to prevent relative rotation between said externally-threaded nut and said second body portion,
(q) said opening in said end wall of said externally-threaded nut being dimensioned so said externally-threaded nut must be forced over said rib on said second body portion and so said rib will thereafter serve as a stop and thereby prevent accidental separation of said externally-threaded nut from said second body portion,
(r) said internally-threaded nut being rotatable in one direction relative to said externally-threaded nut to pull said nuts, and hence said shoulders on the said first and said second body portions, toward each other,
(s) said internally-threaded nut being rotatable in the opposite direction relative to said externally-threaded nut to free said nuts, and hence the said first and said second body portions, for movement away from each other.

3. A readily-openable holder for an electric fuse which comprises:
(a) a body portion that has a recess in one end thereof to releasably accommodate one end of an electric fuse, said recess having a length shorter than the overall length of said electric fuse,
(b) said body portion having an abutting surface at the exterior thereof which projects outwardly beyond adjacent portions of said exterior of said body portion to serve as an abutment,
(c) said body portion having a retaining surface at the exterior thereof spaced from said abutting surface which acts as a stop,
(d) a nut with an end wall,
(e) said end wall of said nut having an opening therein to enable said end wall to telescope over one of the ends of said body portion,
(f) said opening in said end wall of said nut being dimensioned so said nut must be forced over said retaining surface and so said retaining surface will thereafter serve as a stop and thereby prevent accidental separation of said nut from said body portion,
(g) said opening in said end wall of said nut being dimensioned so said end wall of said nut can abut and bear against said abutting surface,
(h) a second body portion that has a recess in one end thereof to releasably accommodate the opposite end of said electric fuse, said recess having a length shorter than the overall length of said electric fuse,
(i) said second portion having an abutting surface at the exterior thereof which projects outwardly beyond adjacent portions of said exterior of said second body portion to serve as an abutment,
(j) a retaining surface on the exterior of said second body portion spaced from said abutting surface on said second body portion which acts as a stop,
(k) a second nut with an end wall that has an opening therein,
(l) said second nut having a thread that mates with the thread on the first said nut,
(m) said opening in said end wall of said second nut being dimensioned so said second nut must be forced over said retaining surface on said second body portion and so said retaining surface will thereafter serve as a stop and thereby prevent accidental separation of said second nut from said second body portion,
(n) said nuts being rotatable in one direction relative to each other to pull said nuts, and hence said abutting surfaces on the first said and said second body portions, toward each other,
(o) said nuts being rotatable in the opposite direction relative to each other to free said nuts, and hence the first said and said second body portions, for movement away from each other.

4. A readily-openable holder for an electric fuse which comprises:
(a) a body portion that has a recess in one end thereof to releasably accommodate one end of an electric fuse,
(b) a terminal that is fixedly secured to and carried by said body portion and that has a hollow shank extending outwardly beyond said body portion to accommodate one end of a conductor,
(c) a sleeve of insulation telescoped onto an appreciable portion of the exterior of said shank of said terminal immediately adjacent said body portion and intimately engaging said appreciable portion of said exterior of said shank of said terminal to prevent relative rotation between itself and said shank of said terminal,
(d) a second body portion that has a recess in one end thereof to releasably accommodate the opposite end of said electric fuse,
(e) a second terminal that is fixedly secured to and carried by said second body portion and that has a hollow shank extending outwardly beyond said second body portion to accomodate one end of a second conductor,
(f) a second sleeve of insulation telescoped onto an appreciable portion of the exterior of said shank of said second terminal immediately adjacent said second body portion and intimately engaging said appreciable portion of said exterior of said shank of said second terminal to prevent relative rotation between itself and said shank of said second terminal,
(g) said sleeves of insulation facilitating the securement of field-installed insulation to said fuse holder, and to said conductors which will not slip relative to said fuse holder.

5. A readily-openable holder for an electric fuse which comprises:
(a) a sturdy and rigid body portion that has a recess in one end thereof to releasably accommodate one end of an electric fuse,
(b) a terminal which is carried by, and which is rigidly and permanently secured to, said rigid body portion,
(c) said terminal being adapted to be secured to a conductor,
(d) a second sturdy and rigid body portion that has a recess in one end thereof to releasably accommodate the opposite end of said electric fuse,
(e) a second terminal which is carried by, and which is rigidly and permanently secured to, said second rigid body portion,
(f) said second terminal being adapted to be secured to a second conductor,
(g) means releasably securing said rigid body portions in rigidly-assembled relation,
(h) said rigid body portions coacting to enclose and confine said electric fuse whenever said rigid body portions are held in rigidly assembled relation by said means,
(i) the rigid securement of the first said terminal to the first said rigid body portion and the rigid securement of said second terminal to said second rigid body portion coacting with the rigidly-assembled relation of said rigid body portions provided by said means to provide a rigid enclosing of said electric fuse which will relieve said electric fuse of mechanical stresses and strains,
(j) a resilient element adjacent an end of said electric fuse to apply a resilient force to said end of said electric fuse and thereby resiliently hold said electric fuse in position within said rigidly-held rigid body portions.

6. A readily-openable holder for an electric fuse which comprises:
   (a) a body portion that has water-proof walls and that has a recess therein to releasably accommodate one end of an electric fuse,
   (b) said body portion having a one wall thereof defining the inner end of said recess,
   (c) a passage through said one wall,
   (d) a terminal that has a portion thereof which fits within and which is permanently held within said passage in said one wall,
   (e) sealing material that provides a water-proof joint between said terminal and said passage,
   (f) a second body portion that has water-proof walls and that has a recess therein to releasably accommodate the opposite end of said electric fuse,
   (g) said second body portion having one wall thereof defining the inner end of said recess in said second body portion,
   (h) a passage through said one wall of said second body portion,
   (i) a second terminal that has a portion which fits within and which is permanently held within said passage in said one wall of said second body portion,
   (j) further sealing material that provides a water-proof joint between said second terminal and said passage in said one wall of said second body portion,
   (k) a yieldable gasket disposed between confronting faces of said body portions, and
   (l) means to force said confronting faces of said body portions into engagement with said resilient gasket to compress said gasket and thereby provide a water-proof joint between said body portions,
   (m) the water-proof joint between the first said terminal and said passage in said one wall of the first said body portion and the water-proof joint between said second terminal and said passage in said one wall of said second body portion coacting with the compression of said yieldable gasket to enable said fuse holder to provide a water-proof enclosing of said electric fuse,
   (n) said means releasably permitting said confronting faces of said body portions to be moved away from each other to facilitate inspection and replacement of said electric fuse.

7. A readily-openable holder for an electric fuse which comprises:
   (a) a body portion that is generally cylindrical in configuration and that has a recess extending inwardly of one end thereof to releasably accommodate one end of an electric fuse,
   (b) a second body portion that is generally cylindrical in configuration and that has a recess in one end thereof dimensioned to accommodate said one end of the first said body portion,
   (c) said second body portion having a further recess which is contiguous with the first said recess and which extends inwardly from the first said recess to releasably accommodate the opposite end of said electric fuse,
   (d) a shoulder on the exterior of the first said body portion that is displaced from said one end of the first said body portion to enable said one end of the first said body portion to telescope into the first said recess in said second body portion,
   (e) one face of said shoulder on the first said body portion confronting a face on said second body portion and coacting with said face on said second body portion and with an adjacent portion of said one end of the first said body portion to define a variable width annular recess,
   (f) a resilient O-ring telescoped over said one end of the first said body portion and abutting said one face of said shoulder on the first said body portion and thus disposed within said variable width annular recess,
   (g) said one face on said second body portion being engageable with said O-ring carried by said one end of the first said body portion and being movable toward said one face of said shoulder to decrease the width of said variable width annular recess and thereby compress said O-ring, and
   (h) means to force said one face of said shoulder on the first said body portion and said face on said second body portion toward each other to reduce the width of said variable width annular recess and into sealing engagement with said O-ring to provide a water-tight seal between said body portions,
   (i) said means including internally-threaded and externally-threaded nuts that overlie and enclose and protect said O-ring,
   (j) said body portions and said internally-threaded and said externally-threaded nuts being non-metallic, whereby said holder is strongly resistant to corrosion.

8. A readily-openable holder for an electric fuse which comprises:
   (a) a body portion with a recess therein to accommodate one end of an electric fuse,
   (b) a second body portion with a recess therein to accommodate the other end of said electric fuse,
   (c) a nut telescoped over one end of the first said body portion and supported and carried by the first said body portion,
   (d) a second nut telescoped over one end of said second body portion and supported and carried by said second body portion,
   (e) said nuts having mating surfaces thereon that are engageable with each other to draw said nuts and the first said and said second body portions toward each other and to hold the first said and said second body portions in assembled relation to enclose and confine said electric fuse,
   (f) interacting surfaces on the first said body portion and on the first said nut to permit said first said nut to be assembled with the first said body portion but to thereafter prevent accidental separation of said first said nut from the first said body portion,
   (g) at least one of said interacting surfaces being yieldable, and
   (h) further interacting surfaces on said second body portion and on said second nut to permit said second nut to be assembled with said second body portion but to thereafter prevent accidental separation of said second nut from said second body portion,
   (i) at least one of said further interacting surfaces being yieldable.

9. A readily-openable holder for an electric fuse which comprises:
   (a) a body portion that has a recess in one end thereof to releasably accommodate one end of an electric fuse,
   (b) a terminal that is permanently secured to and carried by said body portion,
   (c) a second body portion that has a recess in one end thereof to releasably accommodate the opposite end of said electric fuse,
   (d) a second terminal that is permanently secured to and carried by said second body portion,
   (e) said recess in the first said body portion communicating with the first said terminal,
   (f) the first said terminal being fixedly held against movement relative to the first said body portion,
   (g) a movable contact disposed within said recess in the first said body portion to receive one of the contacts of said electric fuse,
   (h) a flexible conductor extending between said movable contact and the first said terminal to electrically connect said movable contact to the first said terminal while permitting said movable contact to move relative to the first said terminal, and
(i) a helical compression spring that biases said movable contact away from the first said terminal but that can yield to permit said movable contact to be moved toward said terminal,
(j) said flexible conductor generally having the form of a helix to enable said flexible conductor to have a substantial current-carrying capacity while being readily flexible,
(k) said helical compression spring and said flexible conductor yielding as the first said and said second body portions enclose and confine said electric fuse, and said flexible conductor thereafter permitting said helical compression spring to press said movable contact against said one contact of said electric fuse.

References Cited

UNITED STATES PATENTS

| | | | |
|---|---|---|---|
| 1,711,996 | 5/1929 | Erickson | 200—119 |
| 3,093,448 | 6/1963 | Kirkpatrick et al. | 174—110.44 |
| 3,066,272 | 11/1962 | Quackenbush | 339—89 X |
| 3,243,550 | 3/1966 | Hollins | 200—129 X |
| 3,243,551 | 3/1966 | Hollins | 200—129 X |
| 3,281,558 | 10/1966 | Weber | 200—129 |

BERNARD A. GILHEANY, *Primary Examiner.*

H. B. GILSON, *Assistant Examiner.*